US011321786B1

(12) United States Patent
Zamer

(10) Patent No.: US 11,321,786 B1
(45) Date of Patent: May 3, 2022

(54) FAN IDENTIFICATION ON A COMMUNICATION DEVICE FOR A PERFORMER DURING A PERFORMANCE

(71) Applicant: STUBHUB, INC., San Francisco, CA (US)

(72) Inventor: Kamal Zamer, Austin, TX (US)

(73) Assignee: STUBHUB, INC., San Francisco, CA (US)

( * ) Notice: Subject to any disclaimer, the term of this patent is extended or adjusted under 35 U.S.C. 154(b) by 763 days.

(21) Appl. No.: 14/675,500

(22) Filed: Mar. 31, 2015

(51) Int. Cl.
G06Q 50/00 (2012.01)
H04L 51/52 (2022.01)

(52) U.S. Cl.
CPC ............ *G06Q 50/01* (2013.01); *H04L 51/32* (2013.01)

(58) Field of Classification Search
USPC ........................................................ 705/319
See application file for complete search history.

(56) References Cited

U.S. PATENT DOCUMENTS

| | | | |
|---|---|---|---|
| 9,147,117 B1* | 9/2015 | Madhu | G06K 9/00335 |
| 9,747,285 B1* | 8/2017 | Laufer | G06F 17/30 |
| 2006/0095344 A1* | 5/2006 | Nakfoor | G06Q 10/02 |
| | | | 705/26.1 |
| 2009/0189977 A1* | 7/2009 | Delia | G06Q 10/06 |
| | | | 348/61 |
| 2012/0143952 A1* | 6/2012 | von Graf | G06Q 10/10 |
| | | | 709/204 |
| 2012/0246072 A1* | 9/2012 | Ligtenberg | G06Q 30/06 |
| | | | 705/44 |
| 2013/0080348 A1* | 3/2013 | Pantaliano | G06Q 30/02 |
| | | | 705/347 |
| 2013/0232194 A1* | 9/2013 | Knapp | H04L 67/22 |
| | | | 709/203 |
| 2013/0310122 A1* | 11/2013 | Piccionielli | G07F 17/3272 |
| | | | 463/2 |

(Continued)

OTHER PUBLICATIONS

Tietjen, Alexa "Artists who let their Fans Perform with them on stage", Jan. 15, 2015 http://www.vh1.com/news/54455/artists-who-let-fans-perform-on-stage/ (Year: 2015).*

(Continued)

*Primary Examiner* — Sangeeta Bahl
*Assistant Examiner* — Rebecca R Novak
(74) *Attorney, Agent, or Firm* — McDermott Will & Emery LLP

(57) ABSTRACT

There are provided systems and methods for fan identification on a communication device for a performer during a performance. A service provider may determine attendees to a performance given by a performer. The service provider may also determine fan information for each of the attendees, for example, using media related to the performer on a communication device of the attendees, biometrics of the attendees during the performance, and/or social networking interactions. Based on the fan information for one or more attendees, the service provider may choose to recognize certain attendees during the performance, such as with a message from the performer or an upgrade. The service provider may notify the performer on a wearable or prompter device during the performance. The service provider may further track the attendees' interest during the performance and provide feedback to the performer.

20 Claims, 5 Drawing Sheets

(56) References Cited

U.S. PATENT DOCUMENTS

| | | | | |
|---|---|---|---|---|
| 2013/0317868 A1* | 11/2013 | Diamond | ............... | G06Q 10/02 |
| | | | | 705/5 |
| 2015/0264533 A1* | 9/2015 | Geer | ................. | G06Q 30/0226 |
| | | | | 455/456.3 |
| 2016/0007052 A1* | 1/2016 | Haitsuka | ............ | H04N 21/2407 |
| | | | | 725/115 |
| 2016/0110064 A1* | 4/2016 | Shapira | ................ | G06F 16/686 |
| | | | | 705/14.27 |
| 2016/0170938 A1* | 6/2016 | Allen | .................... | G06F 40/279 |
| | | | | 704/9 |

OTHER PUBLICATIONS

Automatic human tracking theatrical spotlight Prakash, Dona; Nigel, K. Gerard Joe. 2015 International Conference on Innovations in Information, Embedded and Communication Systems (ICIIECS). IEEE. (2015) (Year: 2015).*

\* cited by examiner

US 11,321,786 B1

FAN IDENTIFICATION ON A COMMUNICATION DEVICE FOR A PERFORMER DURING A PERFORMANCE

TECHNICAL FIELD

The present application generally relates to user identification at an event using interactions between devices in a computer network and more specifically to fan identification to a performer during an event.

BACKGROUND

A performer may give a performance to a large group of viewers during an event at a venue. The viewers may be split up between fans with high interest in the performer and those with lower interest in the performer. For example, some bigger fans of the performer may follow the performer's tour or may have purchased large amounts of media and/or memorabilia for the performer. However, other attendees may have only recently started following the performer or may have received tickets to the event from a contest or present, and thus, be less interested in the performer. Without knowing the fan's individual interest in the performer, the performer may miss valuable time in rewarding loyal fans and/or increasing interest in more casual fans. Moreover, the performer may not know the particular interests of those fans, for example, the performer's various work products, and thus a playlist for the performer may not be optimized to the performer's current audience. The performer may also wish to debut new or recent work during the performance; however, without adequate feedback from the fans, the performer may not know which new work is of the most interest to the fans.

Figure 1:
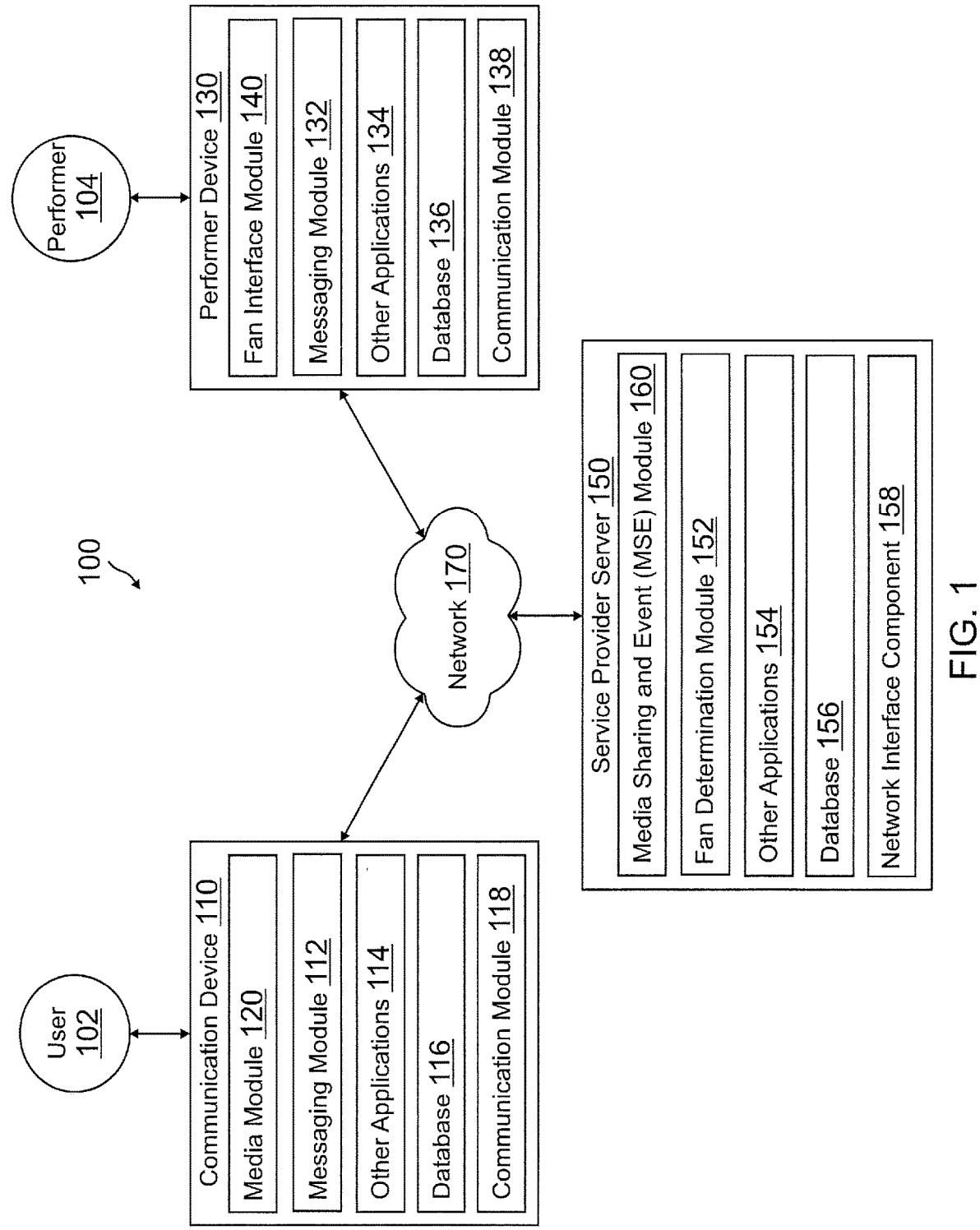
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide fan identification to a performer during an event using data communicated between and processed from devices in a computer network. Systems suitable for practicing methods of the present disclosure are also provided.

A service provider server, such as server for a performer, event, venue, and/or ticket sales provider, or other type of service provider, may provide for fan determination and identification at a venue where an event or performance (e.g., a concert, showing, play, conference, etc.) by a performer (e.g., musician, actor, speech giver, etc.) is being hosted. The venue may have a list of attendees for the event, which may include a list of ticket purchasers, an RSVP list, users scanned in through ticket purchases or identification at the venue, postings from social networks, or other attendee list. The venue or event host may communicate the list of attendees to the service provider server for analysis of the attendees to determine one or more fans to identify during the performance or after the performance, for example, during an autograph signing, opportunity to meet the performer, or some other event occurrence. Note that "the event" may include all times that an attendee is at the venue, including times when the performer is not actually performing or on stage. The service provider server may receive information from the fans from one or more devices and/or services, and may also scrape publicly available information resources (e.g. websites, social networking resources, blogging and microblogging services, etc.) in order to build fan information for each of the attendees at the event. Thus, the service provider server may have fan information for the list of attendees used to determine which of the users attending the event to identify.

For example, the service provider server may determine and build a database of fan information for each of a plurality of users, including some or the entire list of attendees for the event of the performer, using information received from a communication device of a user. The information from the communication device may include stored media and/or media playback lists, which may include media for the performer at the event. The media playback information may include what content (e.g., songs, speeches, stories, etc.) the user has an interest in (e.g., has downloaded or purchased), a number of playbacks of the media, a number of playlists of the media, and total media purchased/downloaded for the performer. Thus, a media playback module/application of the user device may provide media statistics for media related to the performer to the service provider server.

The service provider server may also receive information from one or more third party resources about the users' interests. For example, a user may have a social networking account and/or microblogging account. The service provider may receive details for the account(s) from the user's communication device, based on a user profile with the service provider server, and/or from an Internet search for the user. The service provider may view postings and other information listed by the user about the performer, such as postings of media by the performer and/or announcements/ discussions the user has had about the performer. The third party information may also include likes and dislikes in a user profile, and may include location information for the user, which may be tied to the performer based on past performances by the performer, other events associated with the performer, and/or events associated with fans of the performer (e.g., attending a fan convention associated with the performer or a genre for the performer). Other third party resources for determined interests of the user may include a payment services provider, such as PAYPAL®, which may provide information on purchases by the user (e.g., of media, tickets, memorabilia, etc.).

Third party information from social networking and/or microblogging resources may also include media captured by the user at a performance for the performer, such as a picture or video of the performer during a performance, including the performance currently attended by the user. For example, the user may capture media during a past or present performance and post such information to a social networking site. In other embodiments, the media may be messaged to another user. Thus, fan information may also include media shares and messaging during past or present events by the performer, which may include media of the user (e.g., photos and videos of the user and/or user's friends during a performance) as well as media of the performer. Other information for the user may be accrued during the present performance, including biometrics for the user. For example, heart rate, movement, perspiration, body temperature, or other biometrics may be utilized to determine how much the user is enjoying the show. Such information may be gathered from a device associated with the user, including biometric sensing device, or from a device for the venue, such as video cameras, infrared cameras, etc. Thus, if certain users are dancing more, or more interactive with the performance, it may be determined that those users are more interested in the performance and/or larger fans of the performer.

Moreover, the service provider may receive and/or access additional information used to determine fan preferences and/or the loyalty level of the fan (e.g., how important the event is to the fan). Such information may include how much effort or sacrifice was taken by the user to attend a performance, which may include travel time and/or method, traffic to attend the performance, weather to attend the performance, and/or cost to attend to the performance. A communication device of the user and/or a third party may provide such information to the service provider, for example, based on available mapping, travel, and/or weather information or a travel route of the user from a mapping/GPS service. Moreover, the user may purchase items prior to the performance, including memorabilia and/or media of the performance. The communication device and/or a payment provider may provide transaction histories to the service provider for processing. The user, payment provider, or a financial institution may also provide information on the user's finances and/or income level, in order to determine how much the user spent of available finances to attend the performance (e.g., a relative cost to the user based on income/available assets). Moreover, a ticket service provider may provide information to the service provider about how often or how many times the user has viewed the performer, whether the user attends the performance for the performer with any additional users, when the performance is and whether the user's schedule fits or had to be rescheduled for the performance, whether the user is missing work or another event to attend the event and how important the missed event is to the user, and/or how long the user waited in a line to purchase admission and/or access the venue. Thus, generally, the more the user has sacrificed to attend the event, the more important the event is to the specific user.

The service provider may therefore include the aforementioned information for one or more of the users attending the event. Using the information, the service provider may determine one or more users to highlight during the event, which may also include groups of users (e.g., a family, group of friends, etc.). For example, a fan level for each fan attending the event may be determined, which may correspond to a score based on the aforementioned information or other measurable. The fan level may be utilized to determine whether to identify a user before, during, or after the performance. Thus, a high fan level or a fan level over a threshold may correspond to users for identification. The service provider may access identification information for the user(s) to identify (e.g., a name, seating location, image, or other identifying information). The service provider may then generate a message to the performer (or associated with the performer, such as stage crew) to identify the user(s) during the performance. The message may be a generic identification of the user by name, or may identify the user with a part of the performance, such as a song to be sung. Thus, if the fan information also includes one or more favorite performances, songs, scenes, etc., during the event, the performer may dedicate the section to the user. The message may also include an offer to upgrade seating to the user, including backstage passes, or to provide the user with an after show meeting with the performer, as well as an autograph session or an upgrade to the front of a line during the autograph session. In one embodiment, the user may not be identified, but simply a preference of the user or a group of user is identified to the performer, so that the performer may adjust the performance as desired.

User preferences for the user may also be accessed and/or determined for the user, which may be used to generate the message. For example, an interest of the user in an autograph, song, content, message, spotlight of the user during the performance, and/or additional media (e.g., DVD of the performance or images of the user at the performance), may affect generation of the message and/or the content of the message. The user preferences may be determined based on user interests, a user profile, messages by the user, past purchases by the user, past experiences of the user, past performances attended by the user, biometrics of the user, and/or preferred interactions by the user. Thus, if a user already has the performer's autograph (such as known from a past purchase, social postings, emails, previous interaction with the performer, etc), instead the user may receive upgraded seating if premium seating is important to the user (such as known from prior ticket purchases or seating). Similarly, if the user is shy (such as evidenced by little or no postings on social networks), the user may not want to be identified during the performance, while a large group that travelled a long distance may wish to be recognized.

The message may be communicated to a communication device associated with the performer for presentation during the event, including during the performance. The communication device may include a wearable for the performer or a prompter device nearby the user (e.g., on a stage), so that the performer may view the message during the event. The message may include the identification for the user, which may include an image or facial recognition data for the user allowing the communication device and/or performer to identify the user. In other embodiments, the message may include a section for the user, for example, if the venue is too large to recognize the user individually. The message may also be communicated to a device for the venue, which may provide lighting (e.g., a spotlight) on the location of the user when the performer identifies the user.

The service provider server may use all or part of the fan information to determine a schedule or other type of playlist for the event. For example, the fan information may be utilized to determine most desired songs to play during a performance based on the users attending the performance. Thus, if users are particularly interested in certain work by the performer, a playlist may be tailored to the users (or group of users) attending the venue. During the performance, as users react to the performance, biometrics, media sharing, messaging, and/or other actions of the users may be processed to determine how much the users overall and individually were interested in the performance and at the sub-parts of the performance (e.g., songs). The information may be utilized to determine playlists for future performances and/or sales of items associated with the performer, including media sales.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a performer 104, a communication device 110, a performer device 130, and a service provider server 150 in communication over a network 170. User 102, such as an attendee for an event, may attend an event associated with performer 104, where performer 104 gives a performance. Service provider server 150 may determine fan information for user 102 and may determine whether to identify user 102 during the event using the fan information. If service provider server 150 determines to recognize user 102 during the event, service provider server 150 may generate a message having identification information for user 102. The message may be communicated to performer device 130 for presentation during the event to identify user 102. Additionally, service provider server 150 may accrue information for user 102, including fan information, from communication device 110, which may later be used to provide performance statistic, attributes, and interest levels to performer 104 through performer device 130.

Communication device 110, performer device 130, and service provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Communication device 110 may be implemented using any appropriate hardware and software configured for wired and/or wireless communication with performer device 130 and/or service provider server 150, for example, over network 170. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly, for example, in possession by one or more lenders, which may correspond to the same or different financial offer.

Communication device 110 of FIG. 1 contains a media module 120, messaging module 112, other applications 114, a database 116, and a communication module 118. Media module 120, messaging module 112, and other applications 114 may correspond to executable processes, procedures, and/or applications with associated hardware. In other embodiments, communication device 110 may include additional or different software as required.

Media module 120 may correspond to one or more processes to execute modules and associated devices of communication device 110 to provide for media playback of stored and/or retrievable data to user 102, store information associated with media purchase and/or playback, and provide such information to service provider server 150 for processing. In this regard, media module 120 may correspond to specialized hardware and/or software utilized by communication device 110 to access stored or retrievable media, which may include audio, visual, and audiovisual media, such as artists music, videos, images, presentations, or other type of media for playback. Media module 120 may receive such media from a website hosted by a server or another communication device. The media may be stored to communication device 110, for example, in database 116, or may be retrievable from the device/server. In various embodiments, media module 120 may include a general browser application configured to retrieve, present, and communication information over the Internet (e.g., utilize resource on the World Wide Web) or a private network. For example, media module 120 provide a web browser, which may send and receive information over network 170, including retrieving website information and playback of media available from a website. However, in other embodiments, media module 120 may include a dedicated application of marketplace module 150 or other entity, which may be configured to store and playback media, including audio, visual, and audiovisual media.

Thus, media module 120 may provide for playback of accessible media to user 102. After receipt of such media and/or playback of the media, media module 120 may include information about media and media interests for user 102. For example, media module 120 may include information on what media is stored and/or retrieved by user 102 through communication device 110. Media module 120 may also include other stored media for user 102 with media, such as images of media and/or performers of media used by media module 120. Media module 120 may allow for tracking of a number of playbacks of media as well as media added to playlists for the user, including how often a piece of media appears across playlists and how often the playlist is played. Media module 120 may also track other information about media and media playback for user 102, such as a total media played, purchased, and/or downloaded for a specific performer, a genre for a performer, and/or related performers (e.g., through genre, similar performer acts, etc.). Media module 120 may communicate the information for media associated with user 102 to service provider server 150. Service provider server 150 may then process the media to determine whether to identify user 102 at a performance for performer 104, as explained herein.

Messaging module 112 may correspond to one or more processes to execute modules and associated specialized hardware of communication device 110 to receive one or more notifications or messages from service provider server 150 and/or another device or server (e.g., performer device 130) and output the messages to user 102, such as through audio output, visual output, and/or audiovisual output. In this regard, messaging module 112 may correspond to specialized hardware and/or software utilized to provide a convenient interface to communicate messages to user 102 using an output display module of communication device 110. Messaging module 112 may receive a notification or message from communication module 118 communicated by service provider server 150 over network 170, and/or by performer device 130 over short range wireless communications and/or network 170. The short range wireless communications may use one of near field communication, radio communication, infrared communication, Bluetooth communication, Bluetooth Low Energy (BLE) communication, LTE Direct communication, and WiFi communication. The message may include a message determined by service provider server 150 for identification of user 102 during a performance for performer 104, as discussed herein. In such embodiments, the message may include a message from performer 104, such as a greeting and information for an offer by performer 104. The greeting may alert user 102 of when performer 104 chooses to identify user 102 and/or a song or other presentation during the performance dedicated to user 102. The offer may include an upgrade of seating for user 102, or other offer, such as a backstage pass, memorabilia, and/or opportunity to meet performer 104. The offer may include information on redemption of the offer, such as a location needed for redemption and/or a code or other information necessary to retrieve or access the offer. The message may be interactive, allowing for user 102 to contact a person for redemption and/or receive the offer. For example, messaging module 112 may be implemented as a user interface where user 102 may view the information and then make selections from the message. In various embodiments, messaging module 112 may provide further information sent from service provider server 150 and/or performer 104, such as an autograph opportunity or upgrade of a line wait for an autograph opportunity.

In various embodiments, one or more features of media module 120 and/or messaging module 112 may be incorporated in the same application so as to provide their respective features in one application.

Communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over a network, or other types of applications. Other applications 114 may also include email, texting, voice and IM applications that allow a user to send and receive emails, calls, texts, and other notifications through a network, including notifications related to social networking, microblogging, and/or media sharing services, which may provide actions, messages, and/or postings prior to or during a performance by performer 104 to service provider server 150. In various embodiments, other applications 114 may include financial applications, such as banking, online payments, money transfer, or other applications associated with a payment provider, which may be used to provide purchase and payment information to service provider server. Other applications 114 may include social networking, media sharing, microblogging, and other applications, which may also be used, for example, to provide information to service provider server 150, which may include identification of accounts associated hosted by the service providers and/or access to the accounts. Other applications 114 may also provide for tracking of biometrics associated with user 102, which may include biometrics determined during a past or present presentation by performer 104, and may correspond to heart rate, perspiration, body temperature, movement, or other biometric information. Other applications 114 may contain software programs, executable by a processor, including a graphical user interface (GUI) configured to provide an interface to the user.

Communication device 110 may further include database 116 which may include, for example, identifiers such as operating system registry entries, cookies associated with media module 120, messaging module 112, and/or other applications 114, identifiers associated with hardware of communication device 110, or other appropriate identifiers, such as identifiers used for user/device/account authentication or identification. Identifiers in database 116 may be used by service provider server 150 to associate communication device 110 with a particular account maintained by service provider server 150, or by another service provider, such as a social networking service, microblogging service, messaging service, and/or media sharing service. Database 116 may include received and communicated information, which may include received messages, biometrics, or other information.

Communication device 110 includes at least one communication module 118 adapted to communicate with performer device 130 and/or service provider server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Performer device 130 may be implemented using any appropriate hardware and software configured for wired and/or wireless communication with communication device 110 and/or service provider server 150, for example, over network 170. For example, in one embodiment, performer device 130 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Performer device may also act as a prompter device or other device at a venue, which may be visible by performer 104, may be included or be connected to one or more backend processing units. Although a device is shown, the device may be managed or controlled by any suitable processing device. Although only one performer device is shown, a plurality of performer devices may function similarly, for example, located throughout a venue associated with a performance by performer 104.

Performer device 130 of FIG. 1 contains a fan interface module 140, messaging module 132, other applications 134, a database 136, and a communication module 138. Fan interface module 140, messaging module 132, and other applications 134 may correspond to executable processes, procedures, and/or applications with associated hardware. In other embodiments, performer device 130 may include additional or different software as required.

Fan interface module 140 may correspond to one or more processes to execute modules and associated devices of performer device 130 to access messages received from service provider server 150 to identify one or more fans selected by service provider server 150 based on fan information for attendees of an event where performer 104 is performing and present the message and/or identification information of the selected fans to performer 104 before, during, and/or after the performer. In this regard, fan interface module 140 may correspond to specialized hardware and/or software utilized by performer device 130 to access messages received by performer device 130 from service provider server 150, which may be received by communication module 138 of performer device 104. The messages may be stored to database 136 in various embodiments, for presentation at a selected time by fan interface module 140, or may be loaded and presented to performer 104 after receipt by communication module 138. The message may include at least identification information for the selected fan, such as user 102 (e.g., name of user 102, location at the venue for user 102 (area to point/look towards, seat/section number, etc.), image or data used for facial recognition of user 102 or other identifying information). However, in further embodiments, the message may also include a communication or an announcement for user 102, such as a thank you announcement, special occasion, etc., as well as offers for user 102, such as a seating upgrade, backstage pass, autograph, and/or introduction/meeting with performer 104.

Thus, fan interface module 140 may further provide for an interface viewable by performer 104 for outputting the messages to performer 104, such as through audio output, visual output, and/or audiovisual output. The interface may generally display the message to performer 104, or also may display other information necessary for identification of user 102 from the message. For example, fan interface module 140 may display a map with a location for user 102 or may display an image of user 102 for identification of user 102. In various embodiments, fan interface module 140 may process data received for identification of user 102 to display user 102 and/or a location for user 102 through the interface. For example, where performer device 130 corresponds to a wearable, fan interface module 140 may highlight a portion of the venue and/or a person in the venue. Fan interface module 140 may also display the communication or announcement determined by service provider server 150 to user 102. Additionally, fan interface module 140 may display the determined offer for user 102, which may be communicated to user 102 by performer 104. In other embodiments, the offer may be decided by performer 104 and/or selected from a list provided by performer 104, which may be communicated to user 102 by performer 104 and/or through messaging module 132 to communication device 110.

Messaging module 132 may correspond to one or more processes to execute modules and associated specialized hardware of communication device 110 to communicate messages to user 102 through communication device 110 and/or receive messages from communication device 110 and/or another device/server, including service provider server 150. In this regard, messaging module 132 may correspond to specialized hardware and/or software utilized to provide a convenient interface to communicate messages to communication device 110 using communication module 138. Messaging module 112 may transmit a communication to communication device 110 through communication module 138, which may correspond to an offer, announcement, or other communication determined from a message received from service provider server 150 and/or selected by performer 104 after receiving the message. Messaging module 132 may utilize short range wireless communications, such as one of near field communication, radio communication, infrared communication, Bluetooth communication, Bluetooth Low Energy (BLE) communication, LTE Direct communication, and WiFi communication, to communicate with communication device 110. The message to user 102 from performer 104 may include a greeting, announcement, and/or offer from performer 104 before; during, and/or after a performer by performer 104 that user 102 is attending. The message may include a song or other performance event dedicated to user 102 and a time for playing the performance event. Moreover, an offer for user 102 may include an upgrade of seating for user 102, or other offer, such as a backstage pass, memorabilia, and/or opportunity to meet performer 104. The offer may further include information on redemption of the offer, such as a location needed for redemption and/or a code or other information necessary to retrieve or access the offer. Such information may be determined by service provider server 150 and/or selected or entered by performer 104. For example, the offer and offer details, including redemption details, may be selected by performer 104, in certain embodiments, based on when and/or where performer 104 would like to present the offer. Thus, messaging module 132 may provide further information sent by performer 104 to user 102, such as an autograph opportunity or upgrade of a line wait for an autograph opportunity and how to receive such an autograph.

In various embodiments, one or more features of fan interface module 140 and/or messaging module 132 may be incorporated in the same application so as to provide their respective features in one application.

Performer device 130 includes other applications 134 as may be desired in particular embodiments to provide features to performer device 130. For example, other applications 134 may include security applications for implementing client-side security features, programmatic client applications for interfacing with appropriate application programming interfaces (APIs) over a network, or other types of applications. Other applications 134 may also include email, texting, voice and IM applications that allow a user to send and receive emails, calls, texts, and other notifications through a network, including message related to a performance by performer 104. For example, other applications 134 may receive information on past performances and audience reaction to past performances. Thus, other applications 134 may provide information determined by service provider server 150, which may correspond to audience reaction to the performance overall and/or parts of the performance, as explained herein. In other embodiments, performer 104 and/or management for performer 104 may access the information from service provider server 150 using another device. Other applications 134 may also include applications associated with offers to user 102, which may include seating upgrades, passes, or other offers and may provide such offers or request such offers from a service provider associated with the venue. In various embodiments, other applications 134 may include financial applications, such as banking, online payments, money transfer, or other applications associated with a payment provider. Other applications 134 may include social networking, media sharing, microblogging, and other applications, which may also be used in conjunction with messaging module 132 and/or fan interface module 140, for example, to interact with fans and/or receive fan information. Other applications 134 may contain software programs, executable by a processor, including a graphical user interface (GUI) configured to provide an interface to the user.

Performer device 130 may further include database 136 which may include, for example, identifiers such as operating system registry entries, cookies associated with fan interface module 140, messaging module 132, and/or other applications 134, identifiers associated with hardware of performer device 130, or other appropriate identifiers, such as identifiers used for payment/user/device authentication or identification. Identifiers in database 136 may be used by service provider server 150 to associate performer device 130 with a particular account maintained by service provider server 150. Database 136 may include received and communicated information, which may include messages to identify one or more users during a performance, information associated with such messages, and/or performance statistics, reactions, and other analysis based on audience reaction, participation, and/or actions during a performance.

Performer device 130 includes at least one communication module 138 adapted to communicate with communication device 110 and/or service provider server 150. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 150 may be maintained, for example, by a service provider entity, which may provide for determination of fans to identify during a performance by performer 104 and audience interest in such performance. In this regard, service provider server 150 includes one or more processing applications which may be configured to interact with communication device 110 and/or performer device 130 to provide such messages to performer device 130 (including additional messages, offers, or other communications to communication device 110, in certain embodiments). In one example, service provider server 150 may be provided by STUBHUB®, Inc. of San Francisco, Calif., USA. However, in other embodiments, service provider server 150 may be maintained by or include another service provider, which may be associated with a venue, an event hosting service, and/or management or other assistance provided to performer 104.

Service provider server 150 of FIG. 1 includes a media sharing and event (MSE) module 160, a fan determination module 152, other applications 154, a database 156, and a network interface component 158. Media sharing and event (MSE) module 160, fan determination module 152, and other applications 154 may correspond to executable processes, procedures, and/or applications with associated hardware. In other embodiments, service provider server 150 may include additional or different modules having specialized hardware and/or software as required.

Media sharing and event (MSE) module 160 may correspond to one or more processes to execute modules and associated specialized hardware of service provider server 150 to provide media for a performer, such as performer 104, to fans of the performer, including user 102, as well has determine and/or accrue information for an event where performer 104 executes a performance. In this regard, media sharing and event (MSE) module 160 may correspond to specialized hardware and/or software to provide media over network 170 to user 102, for example, on communication device 110. Thus, MSE module 160 may access media from an online source and/or database 156, and provide the media to communication device 110. The media may be streamed to communication device 110 and/or downloaded by communication device 110. In various embodiments, user 102 may purchase the media from MSE module 160. MSE module 160 may track media downloads, purchases, streams, or other playbacks, including additions to playlists and/or sharing of the media with other users. The sharing of media with other users may correspond to messaging of the media, posting of the media through a social network or microblogging service, or other communication of the media to another party. After tracking of user 102's actions with respect to media, MSE module 160 may store the information to database 156 for use in determining fan information for user 102 and/or other users by fan determination module 152, as discussed herein.

MSE module 160 may also track, receive, determine, and/or accrue information for an event associated with a performer as well. Such information may include a schedule, playlist, or other type of timing calendar for the event and/or performance by the performer during the event. MSE module 160 may also receive information on audience participation during an event, such as crowd noise, response, attendees entering and/or exiting the venue, and/or attendees leaving during sub-parts of the performance, such as leaving for a song, speaker in a conference, part of a play, etc. (e.g., to visit concessions or a bathroom). MSE module 160 may also receive biometrics for the audience during an event, which may include movement, heart rate, perspiration, and/or temperature. Such information may be received from one or more devices at a venue, such as cameras (visible light and thermal cameras), biometric sensors, motion detectors, etc. In other embodiments, location, biometric, and other information may be received from a communication device for individual audience members, such as communication device 110. Thus, information on audience interest during the event may also include information for individual audience members, including individual audience member biometrics and/or location information. Such event information may be stored to database 156 for use by fan determination module 152, as discussed herein.

Fan determination module 152 may correspond to one or more processes to execute modules and associated specialized hardware of service provider server 150 to processes received, scraped, and/or determined information to generate fan information for one or more attendees at an event and determine at least one message to recognize one or more users attending the event based on the fan information. In this regard, fan determination module 152 may correspond to specialized hardware and/or software to determine fan information based on information received from and/or determined by communication device 110, MSE module 160, and/or a third party resource (e.g., a third party service provider, such as a social networking service, media sharing service, microblogging service, messaging service, etc.). Thus, fan determination module 152 may access information of media, media purchases, and/or media playback for user 102. As discussed herein, such information may include a number of media items user 102 has for a performer, such as performer 104, media playbacks and/or purchases of such media and related items (e.g., albums, images, etc.), as well as ancillary media information, such as playlists and shares of media. Fan determination module 152 may also access information for other relevant actions by user 102, such as past performances user 102 has attended for performer 104, as well as other events, such as autograph signings, fan conventions, etc. The additional information may also include shares of media and/or shares of event attendance by user 102 for media/event for performer 104 using a social networking, microblogging, and/or media sharing service.

Thus, fan determination module 152 may also access social networking, microblogging, and media sharing information for user 102. Such information may be determined from an online resource, such as YOUTUBE®, FACEBOOK®, TWITTER®, or other similar service. Information used by fan determination module 152 to determine fan information may include social networking likes and dislikes, include likes of various users status and content of such status. Information may also include shares of media and postings or status, as well as the content of such postings and/or status. Additionally, associated users, groups, and/or interests may be used. Fan determination module 152 may also access purchase information from one or more payment service provider, which may include information for purchases related to performer 104 by user 102 (e.g., from PAYPAL® and/or VENMO®).

Fan determination module 152 may also access biometrics and actions during a past or present performance for performer 104 by user 102 to determine fan information for user 102. The biometrics and actions may be indicative of an interest by user 102 in the event. The biometrics and actions may also be indicative of higher levels of interest by user 102 in various points during the event, and may be used to determine user 102's likes and dislikes during the event. In various embodiments, fan determination module 152 may determine fan information for attendees at an event after receiving a list of attendees attending the event, however, in other embodiments, the fan information may be determined for users of service provider server 150, such as subscribers to a service provided by service provider server 150 and/or users of a service offered by service provider server 150.

Fan determination module 152 may also access additional information to determine fan information, including travel/weather/traffic/location information, which may be used to determine a difficulty in attending a performance for performer 104 by user 102. The additional information may also correspond to transaction histories, which may be received from communication device 110 and/or a payment provider, and include information of purchases leading up to the performance related to performer 104 and/or the performance (e.g., memorabilia, travel, lodging, etc.). Such information may also correspond to income levels, streams, assets, or other financial information to determine how costly attending the performance was to user 102. For example, user 102 may have spent a considerable amount of money indicating that user 102 does not attend many events and made a special exception for performer 104. In further embodiments, additional information may also include information about ticket purchasing and/or wait times to purchase tickets and/or access a venue for performer 104. Thus, a ticket provider may provide information on wait lines to purchase tickets or access the venue. The ticket provider and/or a calendar service may provide information on how often or how many times user 102 has viewed or interacted with performer 104, if user 102 had to reschedule appointments to view performer 104, or other relevant scheduling information.

Once the aforementioned information is accessed by fan determination module 152 for a plurality of users, fan information for the plurality of users may be determined. The fan information may correspond to a fan level, such as an interest measurable, by each of the plurality of users (including user 102) in a performance by performer 104. Fan determination module 152 may then determine a message to identify a fan, such as user 102, during the performance. The message may include identification for user 102, such as a name, location, image, or other data for user 102. The message may also include communications, instructions, announcements, and/or offers, which may be conveyed to user 102 as discussed herein, such as by performer 104 and/or performer device 130. Fan determination module 152 may determine what to provide to user 102 in the message based on the fan level for user 102. Moreover, fan determination module 152 may determine a plurality of options and/or messages to present to user 102, which may be selected by performer 104.

Fan determination module 152 may further access and/or determine user preferences, which may guide fan determination module 152 in the generation of messages to performer 104 related to user 102. User preferences may include user interests in experiences, offers, and/or interactions with performer 104. User preferences may therefore include where user 102 would like an autograph, to hear a song and which song or other content by performer 104, receive a message by performer 104 and/or a spotlight during a performance by performer 104, and/or receive additional media from performer 104 (e.g., a DVD of the performance, images or video of user 102 during the performance, etc.). The user preferences may be determined using a user profile, past purchases, messages, past experiences, past performances attended, past biometrics, and/or selections of interactions by user 102. The user preferences may be used to determine what message to generate, thereby not offering user 102 items or experiences user 102 has already received (e.g., user 102 already has an autograph) or would not like to receive (e.g., user 102 is too shy to want a spotlight during a performance but would like a post-performance meeting with performer 104).

Fan determination module 152 may also provide information about interest in an event to performer 104. For example, fan determination module 152 may process receive biometrics and actions by user 102 and/or other attendees for an event to determine points of interest by the attendees in the event. The points of interest may be processed against a schedule for the event, so that certain sub-event (e.g., schedule items, event, actions, playlists, etc.) may be associated with an interest by the attendees of the event. Performer 104 may then view the points of interest to determine what from the performance the attendees were most interested. Moreover, fan determination module 152 may breakdown the attendee's information based on the fan levels for each of the attendees, so that performer 104 may view higher and lowers interests for more and less dedicated fans.

In various embodiments, service provider server 150 includes other applications 154 as may be desired in particular embodiments to provide features to service provider server 150. For example, other applications 154 may include security applications for implementing server-side security features, programmatic client applications for interfacing with appropriate application programming interfaces (APIs) over network 170, or other types of applications. Other applications 154 may contain software programs, executable by a processor, including a graphical user interface (GUI), configured to provide an interface to user 102 and/or 104 when accessing service provider server 150, such as a website interface. In various embodiments where not provided by media sharing and event (MSE) module 160, other applications 154 may include connection and/or communication applications, which may be utilized to communication information to over network 170.

Additionally, service provider server 150 includes database 156. Database 156 may be utilized to store information utilized by one or more modules and/or applications of service provider server 150, including media sharing and event (MSE) module 160, fan determination module 152, and/or other applications 154. In this regard, database 156 may include received and/or determined information, including information used to determine fan information, fan information, messages for performer 104 to identify user 102 and/or other users, and information on points and times of interest during a performance by performer 104.

In various embodiments, service provider server 150 includes at least one network interface component 158 adapted to communicate communication device 110 and/or performer device 130 over network 170. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
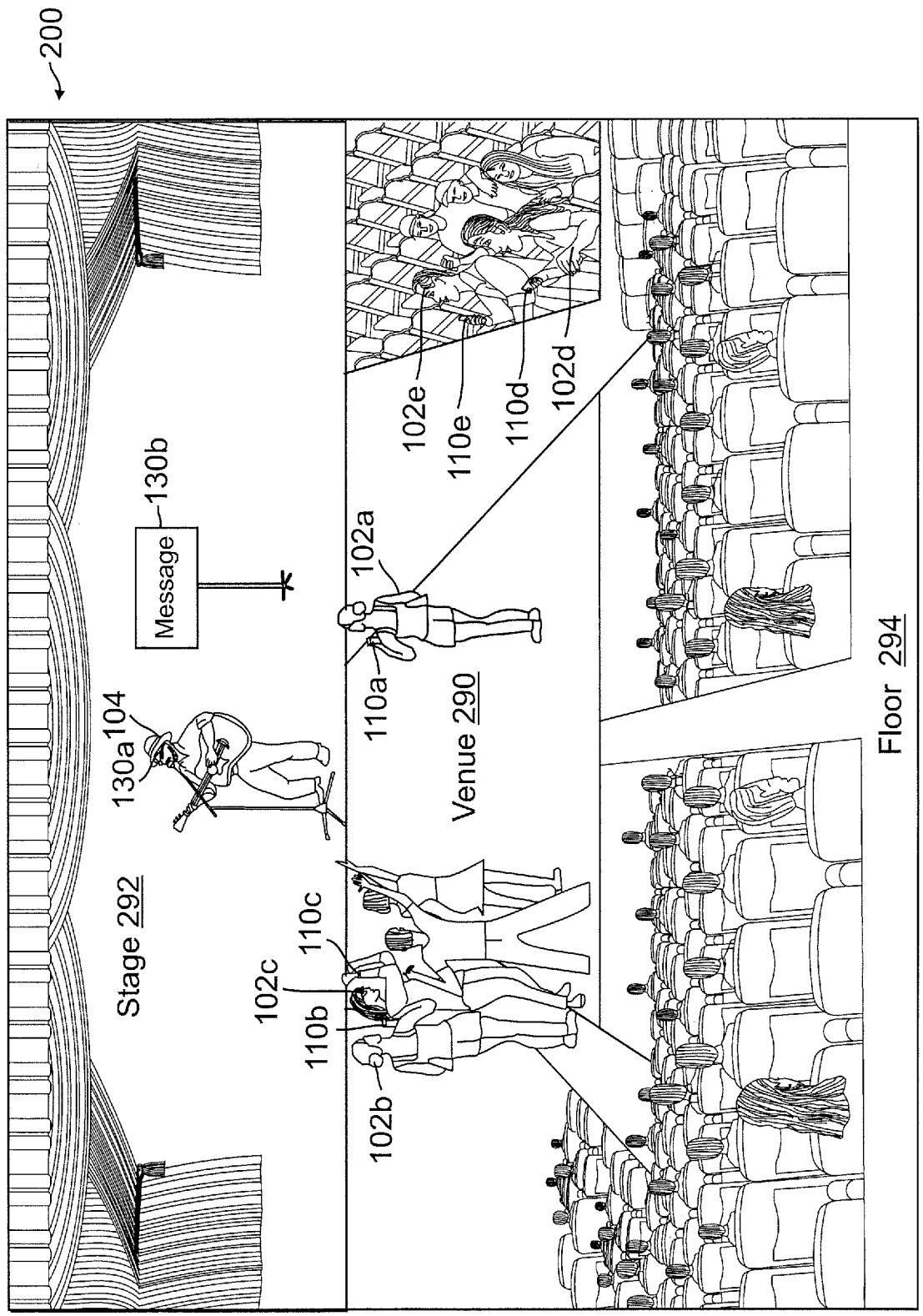
FIG. 2 is an exemplary venue environment for a venue where a performer may interact with fans after receiving messages determined using each fan's individual information, according to an embodiment.

FIG. 2 is an exemplary venue environment for a venue where a performer may interact with fans after receiving messages determined using each fan's individual information, according to an embodiment. Environment 200 of FIG. 2 includes a user 102a utilizing a communication device 110a, a user 102b utilizing a communication device 110b, a user 102c utilizing a communication device 110c, a user 102d utilizing a communication device 110d, and a user 102e utilizing a communication device 110e, all corresponding generally to user 102 utilizing communication device 110, respectively, of environment 100 in FIG. 1. Moreover, environment 200 further includes performer 104 of environment 100 with a performer device 130a and a performer device 130b both corresponding generally to performer device 130 of environment 100.

In environment 200, users 102a-e are attendees to an event at a venue 290 where performer 104 gives a performance, such as a concert, speech, conference, play, or other type of performance or presentation given by one or more performers, including groups of performers. Thus, performer 104 may be located on a stage 292 where performer 104 gives a performance to users 102a-e. At venue 290, users 102a-e may be located among a crowd, and may be associated with each other. For example, user 102a may be alone, while users 102b and 102c are together, and users 102d and 102e are also together. Moreover, users 102a-e may be located at different areas within venue 290. As shown in environment 200, users 102a-c are located on a floor 294, while users 102d and 102e are located in a box 296.

A service provider (not shown) may determine that all or part of users 102a-e are attending venue 290 for the performance by performer 104. For example, a server or device for the service provider may access an attendee list for the performance, such as an event list, ticket purchases, or other type of listing that may note that users 102a-e are at venue 290. Using the listing, fan information for users 102a-e may also be determined, or may be accessed from previously gathered and/or processed information for users 102a-e. The fan information may determine a fan level or fan interest in performer 104 by each of users 102a-e. The service provider may then determine which of users 102a-e to recognize during the performance by performer 104, for example, through a message to performer 104 identifying one or more of users 102a-e. The service provider may determine which of users 102a-e to select based on their fan interest/level or a fan interest/level shared or calculated between users in a group (e.g., users 102b and 102c). Thus, if a fan level meets or exceeds a threshold, or is higher than other users fan level, the user may be recognized.

For example, user 102a may be a big fan of performer 104 such that user 102a has most or all of performer 104's media on communication device 110a. Thus, performer 104 may receive a message on performer device 130a or 130b, where the message asks that performer 104 recognize user 102a. The message may be presented on performer device 130b shown as a wearable eyeglasses computing device, where the message may also identify where user 102a is at venue 290. The message may also be displayed on performer device 130b, such as a prompter device, which may be read by performer 104 during the performance. However, in certain embodiments, user 102a is shy, and would prefer to meet performer 104 backstage or receive an autograph than to be identified during a performance. Thus, the service provider may access user preferences for user 102a and determine a message to performer 104 to invite user 102a to an autograph signing after the show and not announce user 102a during the performance.

Similarly, users 102d and 103e may also be big fans of performer 104 and have travelled a long distance or spent a lot of money to see performer 104. A message may have been sent to performer 104 to provide users 102d and 102e with seating upgrades from floor 294 to box 296 based on how long user 102d and 103e travelled and how much users 102d and 10e have spent. Thus, when determining a message for users 102d and 102e, the service provider may further accesses preferences and/or parameters for users 102d and 102e that inform the service provider of the difficulties that users 102d and 102e took in attending the performance by performer 104. The service provider may then inform performer 104 that performer 104 should offer upgrades to users 102d and 102e to provide users 102d and 102e with an unforgettable experience. Users 102d and 102e may receive the seating upgrades on communication devices 110d and 110e, respectively, allowing users 102d and 102e to access box 296 after recognition and upgrade provided by performer 104.

Moreover, users 102b and 102c may performer different actions during the performance by performer. For example, users 102b and 102c may dance to their favorite songs, or may leave to get drinks or snacks during their least favorite parts of the performance. Users 102b and 102c may also leave early or arrive late knowing they will miss parts of the performance they are uninterested in. Users 102b and 102c may also use communication device 110b and 110c, respectively, to capture media, such as video and images, of performer 104 during especially interesting moments, and communicate the media to other users on social networking services. Communication devices 110b and 110c may track biometrics, movements, and/or media capture and sharing and provide such information to the service provider. The service provider may then determine, times and items of interest for performer 104 during the presentation, which may be communicated to performer 104 for use in future performances and sales.

Figure 3:
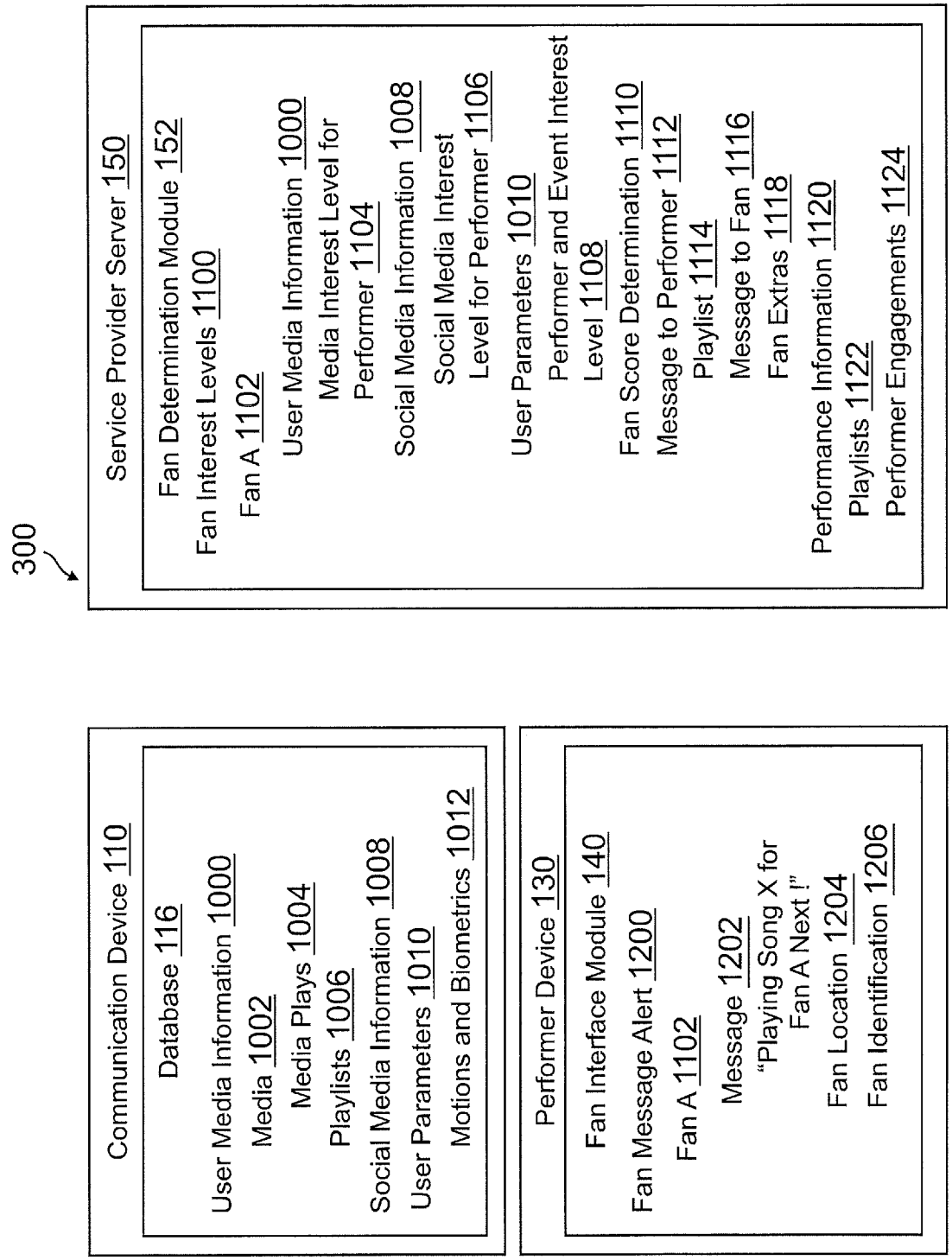
FIG. 3 is an exemplary system environment having a service provider server determining message for a performer device based on fan information, according to an embodiment.

FIG. 3 is an exemplary system environment having a service provider server determining message for a performer device based on fan information, according to an embodiment. Environment 300 includes communication device 110, performer device 130, and service provider server 150 of FIG. 1. The below described hardware and/or software modules execute functions as described herein with respect to environment 100.

Communication device 110 includes a database 116, which may store information determined from specialized hardware and/or software modules and processes described herein in reference to FIG. 1. In this regard, database 116 includes information communicated to service provider server 150 for determination of fan information. However, in further embodiments, service provider server 150 may also accrue, receive, and/or determine fan information from one or more other resource, including devices from a venue hosting a performance, other service providers including social networking, microblogging, and media sharing providers. Database 116 includes user media information 1000, which may include stored media 1002 having media plays 1004 (e.g., a counter for how many times or how often each of media 1002 is played). User media information 1000 may also include playlists 1006 for media 1002. Database 116 may further store social media information, which may correspond to actions a user takes with respect to a social networking, microblogging, and/or media sharing service. Additionally, database 116 includes user parameters 1010, such as motions and biometrics 1012, which may be determined during a performance for a performer.

Once the aforementioned information is received by service provider server 150, service provider server 150 may determine messages for a performer to recognize users attending a performance by the performer. Service provider server 150 executes fan determination module 152 having specialized hardware and/or software modules and processes described herein in reference to FIG. 1. Fan determination module 152 may determine fan information for each of a plurality of users attending the performance for the performer, for example, by determining fan interest levels 1100 for each of the plurality of users. Fan interest levels 1100 include at least a fan A 1102 attending the performance. Information used to determine a fan interest level for fan A 1102 may include user media information 1000 from communication device 110, which may be used to determine media interest level for performer 1104. Social media information 1008 from communication device 110 may also be used to determined social media interest level for performer 1106. Similarly, user parameters 1010 may be used to determined performer and event interest level 1108. In various embodiments, user parameters 1010 may further include user preferences for preferred types of interactions by the performer with fan A 1102 during the performance. For example, fan A 1102 may wish to receive an autograph but not wish to be highlighted during a performance. Thus, user parameters 1010 may also include user preferences used to determine a message to the performer for fan A 1102. Using the determined levels from the received information, a fan score determination 1110 may be determined by the fan determination module 152. If the fan score determination either meets or exceeds a threshold level, or is higher than one or more other users, a message to performer 1112 may be determined, which may include a playlist 1114 for user A 1102, a message to fan 1116 for fan A 1102, and/or fan extras 1118 for fan A 1102, such as upgrades, autographs, etc. Fan determination module 152 may also use information, such as user parameters 1010 including motions and biometrics 1012 with performance information 1120 to provide analytics to the performer, for example, based on playlists 1122 and performer engagements 1124.

Performer device 130 executes fan interface module 140 having specialized hardware and/or software modules and processes described herein in reference to FIG. 1. Fan interface module 140 may be used to display messages received from service provider server 150. For example, fan interface module 140 includes a fan message alert 1200 for Fan A 1102, which includes message 1202, for example, "Playing Song X for Fan A Next!" Fan message alert 1200 also may include a fan location 1202 where the performer may identify fan A 1102, and a fan identification 1204 so that the performer may identify fan A.

Figure 4:
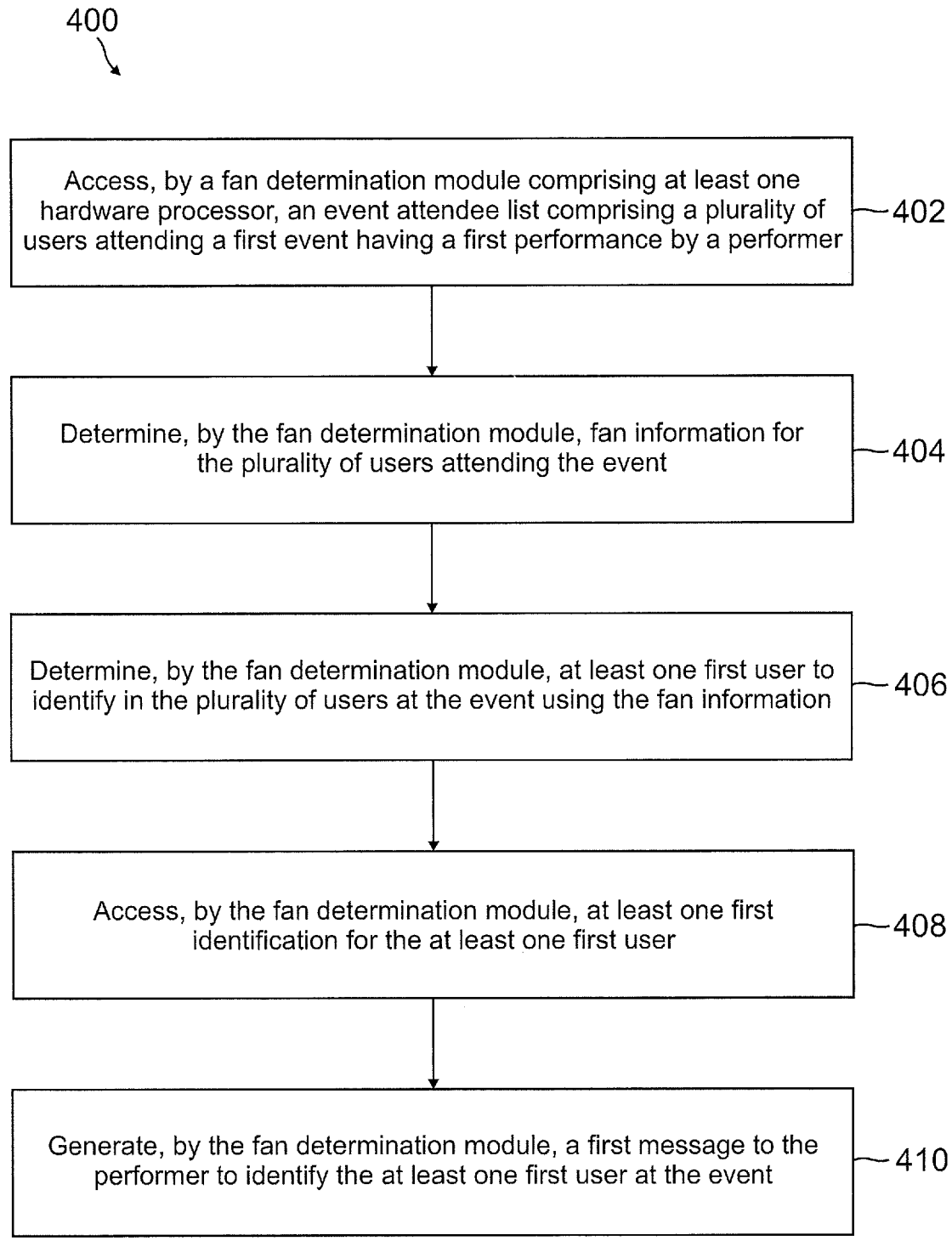
FIG. 4 is a flowchart of an exemplary process for fan identification on communication of a performer during a performance, according to an embodiment.

FIG. 4 is a flowchart of an exemplary process for fan identification on communication of a performer during a performance, according to an embodiment. Note that one or more steps, processes, and methods described herein may be omitted, performed in a different sequence, or combined as desired or appropriate.

At step 402, an event attendee list comprising a plurality of users attending an event having a performance by a performer is accessed, by a fan determination module comprising at least one hardware processor. The event may comprise one of a concert, a play, a showing, a conference, and wherein the performer is involved in the event Fan information for the plurality of users attending the event is determined, by the fan determination module, wherein the fan information comprises an interest by each of the plurality of users in at least one the event and the performer, at step 404. The fan information may comprise a fan level for each of the plurality of users attending the event. The fan information may be determined a playlist for each of the plurality of users, a social networking account for the each of the plurality of users, a microblogging account for the each of the plurality of users, a media sharing account for the each of the plurality of users, media playback information for the each of the plurality of users, and biometrics for the each of the plurality of users. For example, the fan information may be determined from information available from a communication device in possession of the at least one user. The fan information may also be determined using a second performance attended by the at least one user.

At step 406, at least one user to identify in the plurality of users at the event is determined, by the fan determination module, using the fan information. For example, the fan level for the each of the plurality of users may comprise a first fan level for a first user of the plurality of users and a second fan level for a second user of the plurality of users, wherein the first user is determined as the at least one user at the event to identify if the first fan level is higher than the second fan level. At least one identification for the at least one user is accessed, by the fan determination module, at step 408. The at least one identification may comprise a name of the at least one user for use by the performer during the first performance. The at least one identification comprises data used for facial recognition of the at least one user, wherein a device of the performer highlights the at least one user using the data.

At step 410, a message to the performer to identify the at least one user at the event using the at least one first identification is generated, by the fan determination module, which may also be communicated to a device of the performer at the event, wherein the device of the performer displays at least one of the message and the at least one identification to the performer at the event. The device of the performer may comprise one of a wearable computing device on the performer, a prompter device visible to the performer, and a device at the first event connected to earphones for the performer. The message may comprise an announcement of the at least one user during the performance, an offer of an upgrade of seating or a backstage pass to the at least one first user, and/or identification of the at least one user for an autograph by the performer during the event. The message may also identify a location of the at least one user at the event.

In various embodiments, prior to generating the message, the fan determination module may further access user preferences for the at least one user, wherein the fan determination module further generates the message using the user preferences for the at least one user. The user preferences may comprise an interest by the at least one user in one of an autograph by the performer, a song by the performer, content by the performer, a message by the performer, a spotlight during the performance of the at least one user, and media of the at least one user or the performer during the performance. The fan determination module may determine the user preferences using at least one of past purchases by the at least one user, messages by the at least one fuser, a user profile for the at least one user, past experiences by the at least one user, past performances attended by the at least one user, past biometrics by the at least one user, and a selection of a preferred interaction by the at least one user. Thus, the first message may comprise one of an announcement, and offer, and an experience for the at least one user selected based on the user preferences.

The fan determination module may further determine at least one second user to identify in the plurality of users at the event using the fan information, wherein the at least one second user is not related to the at least one first user, access at least one second identification for the at least one second user, and generate a second message to the performer to identify the at least one second user at the event using the at least one second identification at a later time than identifying the at least one first user. For example, the first message may comprise a message to play a first song for the at least one first user after identifying the at least one first user, wherein the first song is determined from the fan information for the at least one first user, and wherein the second message comprises a message to play a second song for the at least one second user after identifying the at least one second user, wherein the second song is determined from the fan information for the at least one second user, and wherein the first song is different from the second song. The fan determination module may further determine times of interest by the plurality of users during the event based on biometrics received for each of the plurality of users. The times of interest may be used to determine performance actions for the performer during the times of interest, wherein the performance actions are communicated to the performer for use in a future performance by the performer or a sale of an item by the performer.

Figure 5:
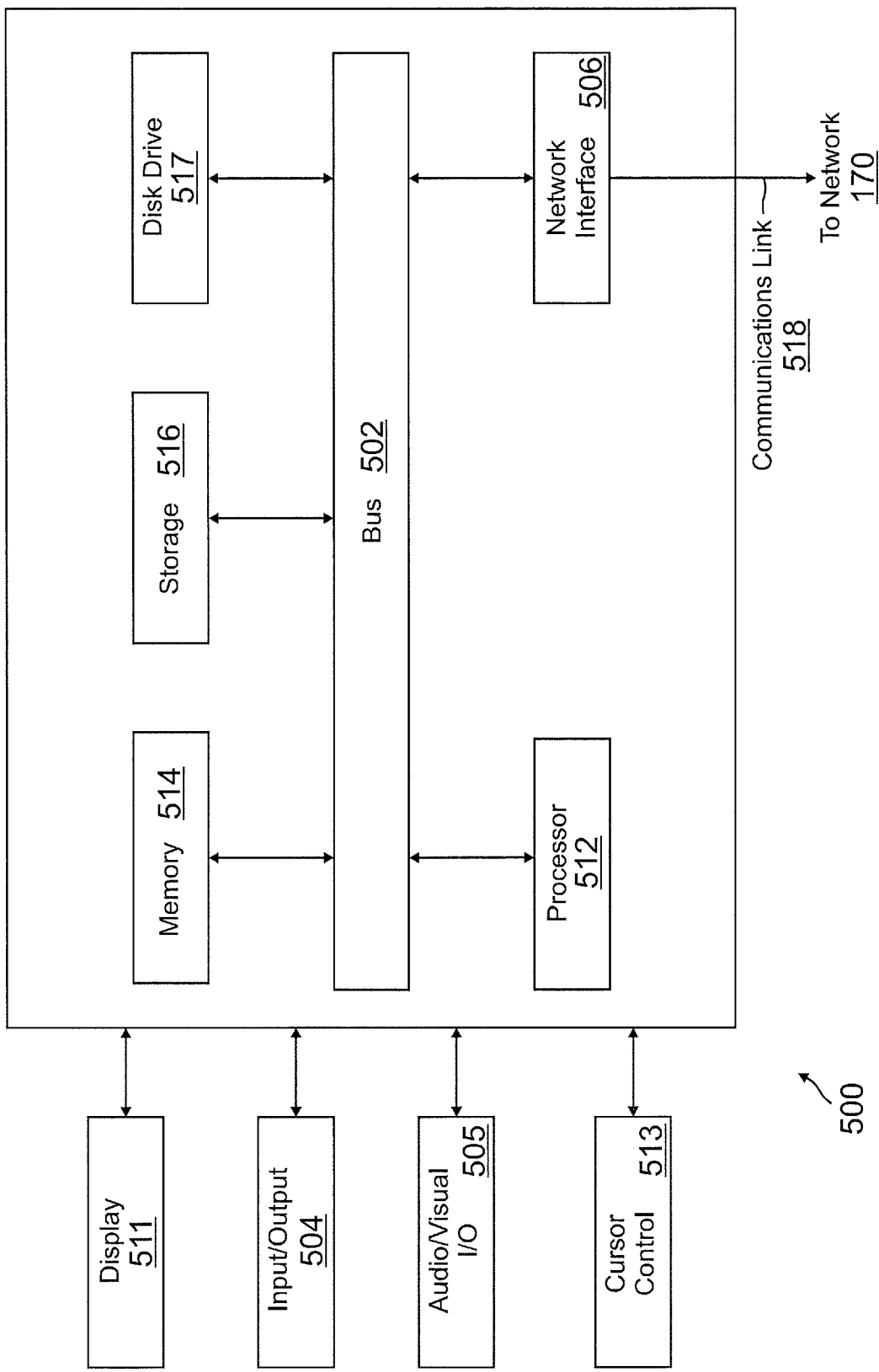
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via a network. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   at least one hardware processor configured to execute instructions to perform operations, the operations comprising:
   access, in a client device, an event attendee list comprising a plurality of users attending an event having a performance by a performer;
   retrieve fan information for the plurality users attending the event, wherein the fan information is tracked by a media tracking module prior to the event based on measurable actions of the plurality of users relating to media of the performer prior to the event;
   generate a plurality of scores, each of the plurality of scores defining a fan level for one of the plurality users attending the event, the scores based on measurable characteristics the fan information;
   compare each of the scores defining the fan level for each of the plurality of users against a threshold;
   in response to one of the scores of a first user exceeding the threshold, generate a first identification indicating, to the performer, multiple user preferences related to the performer of the first user at the event; and
   transmit, to a device associated with the performer during the performance, a first message including the first identification indicating the user preferences of the first user, the first message instructing the performer to adjust the performance based on the user preferences during the event using the first identification and a facial recognition data for the user included in the first message;
   identify a location of the user based on the facial recognition data;
   cause a lighting system to provide a spotlight on the location of the user that has been identified by the facial recognition data, during the event;
   a database that includes a non-transitory memory that stores the event attendee list, the fan information, the first identification, and the first message; and
   a network interface component that communicates the first message to the device associated with the performer, wherein the device associated with the performer is configured to display the first message and the first identification to the performer during the performance.

2. The system of claim 1, wherein the fan level for the each of the plurality of users comprises a first fan level for the first user of the plurality of users and a second fan level for a second user of the plurality of users, and wherein the first message identifies the first user as the first user at the event if the first fan level is higher than the second fan level.

3. The system of claim 1, wherein the first message includes instructions to use a name of the first user during the performance.

4. The system of claim 1, wherein the first identification comprises data used for facial recognition of the first user, to highlight the first user using the data.

5. The system of claim 1, wherein the operations further comprise:
   determine a second user to identify in the plurality of users at the event using the fan information, wherein the second user is not related to the first user;
   access, in the client device, a second identification for the second user; and
   generate a second message to identify the second user at the event using the second identification at a later time than identifying the first user.

6. The system of claim 5, wherein the first message comprises a message to adjust the performance by playing a first song for the first user after identifying the first user, wherein the first song is determined from the fan information for the first user, and wherein the second message comprises a message to play a second song for the second user after identifying the second user, wherein the second song is determined from the fan information for the second user, and wherein the first song is different from the second song.

7. The system of claim 1, wherein prior to a generation of the first message, the operations further comprise access, in the client device, multiple user preferences for the first user, and further generate the first message using the user preferences for the first user.

8. The system of claim 7, wherein the user preferences comprises an interest by the first user in one of: a performer autograph, a song, a performer content, a performer message, a spotlight during the performance of the first user, and media of the first user during the performance.

9. The system of claim 8, wherein prior to accessing the user preferences, determining the user preferences for the first user using at least one of: past purchases by the first user, messages by the first user, a user profile for the first user, past experiences by the first user, past performances attended by the first user, past biometrics by the first user, and a selection of a preferred interaction by the first user.

10. The system of claim 8, wherein the first message comprises one of: an announcement, an offer, and an experience for the first user selected based on the user preferences.

11. The system of claim 1, wherein the fan information is determined by the media tracking module using at least one of: a playlist for each of the plurality of users, a social networking account for the each of the plurality of users, a microblogging account for the each of the plurality of users, a media sharing account for the each of the plurality of users, and media playback information for the each of the plurality of users.

12. The system of claim 1, wherein the fan information is determined using an event attended by the first user, wherein the event comprises at least one of a performer's second performance, a performer event, and a convention associated with the performer's second performance.

13. The system of claim 1, wherein the first message comprises an announcement of: the first user during the performance, an upgrade of seating or a backstage pass to the first user, and a performer autograph at the event.

14. A method comprising:
  accessing, by at least one processor, an event attendee list comprising a plurality of users attending an event having a performance by a performer;
  retrieving, by the processor, fan information for the plurality of users attending the event, wherein the fan information is tracked by a media tracking module prior to the event based on measurable actions of the plurality of users relating to media of the performer prior to the event;
  generating a plurality of scores, each of the plurality of scores defining a fan level for one of the plurality of users attending the event, the scores based on measurable characteristics of the fan information;
  comparing each of the scores defining the fan level for each of the plurality of users against a threshold;
  in response to one of the scores of a first user exceeding the threshold, generating a first identification indicating, to the performer, multiple user preferences related to the performer of the first user at the event;
  transmitting, to a device associated with the performer during the performance, a first message indicating the user preferences of the first user, the first message instructing the performer to adjust the performance based on the first user during the event using the first identification and a facial recognition data for the user included in the first message;
  identifying a location of the user based on the facial recognition data;
  causing a lighting system to provide a spotlight on the location of the user that has been identified by the facial recognition data, during the event; and
  communicating, by a network interface component, the first message to the device associated with the performer, wherein the device associated with the performer is configured to display the first message and the first identification to the performer during the performance.

15. The method of claim 14, wherein the first message identifies a location in the event for the first user.

16. The method of claim 14, wherein the fan information is determined from a communication device in possession of the first user.

17. The method of claim 14, further comprising:
  determining times of interest by the plurality of users during the performance at the event based on biometrics received for each of the plurality of users.

18. The method of claim 17, wherein the times of interest are used to determine performance actions during the times of interest, and wherein the performance actions are communicated for use in a future performance or a sale of a performer item.

19. The method of claim 14, wherein when generating the plurality of scores based on measurable characteristics of the fan information further comprises:
  determining a loyalty level of each of the plurality of users based on determining an effort level taken by each user to attend a performance the effort level being based on a travel route to the performance, money spent in association with the performance, number of times each user has attended a performance by the performer, or a combination thereof.

20. The method of claim 14, wherein when generating the plurality of scores based on measurable characteristics of the fan information further comprises:
  building a database of fan information for each of a plurality of users by obtaining data from a social network account, a microblogging account, each communication device from the plurality of users, a user profile associated with each user, an Internet search, a performer posting listed by each user, likes and dislikes in a user profile, location information of each user, attendance at performer events by each user, attendance at a fan convention, media captured by each user, messages between the plurality of users, biometrics of each user measured during a performance of the performer, or a combination thereof.

* * * * *